United States Patent [19]

Morita

[11] Patent Number: 5,788,906
[45] Date of Patent: Aug. 4, 1998

[54] METHOD FOR MANUFACTURING MAGNETIC TAPE CASSETTE

[75] Inventor: Kiyoo Morita, Kanagawa, Japan

[73] Assignee: Fuji Photo Film Co., Ltd., Kanagawa, Japan

[21] Appl. No.: 834,357

[22] Filed: Feb. 12, 1992

[30] Foreign Application Priority Data

Apr. 17, 1991 [JP] Japan ................... 3-110853

[51] Int. Cl.⁶ ..................... B29C 45/16; B29C 45/13
[52] U.S. Cl. ............... 264/245; 264/255; 264/328.7; 264/328.8
[58] Field of Search .................. 242/199; 264/245, 264/246, 247, 255, 328.7, 328.8, 259

[56] References Cited

U.S. PATENT DOCUMENTS

| | | | |
|---|---|---|---|
| 4,726,758 | 2/1988 | Sekine | 264/245 |
| 5,084,223 | 1/1992 | Morita et al. | 264/245 |
| 5,125,816 | 6/1992 | Morita | 264/245 |

*Primary Examiner*—Angela Ortiz
*Attorney, Agent, or Firm*—Sughrue, Mion, Zinn, Macpeak & Seas, PLLC

[57] ABSTRACT

A magnetic tape cassette and a method for manufacturing a magnetic tape cassette including a combination of upper and lower half cases each including a window part and a main body half, the main body half including a trapezoidal portion on a top side of the main body half extending along a length thereof and defining a portion of the cassette having an increased thickness. The cassette is produced in accordance with a process including the steps of providing a mold having a first injection space defining the main body half and a second injection space defining the window part, providing a first gate, communicating with the first injection space, in the metal mold at a position of the trapezoidal portion of the main body half, injecting a first resin into the first injection space through the first valve gate, providing a second valve gate, communicating with the second injection space, in the metal mold, and injecting a second resin into the second injection space through the second valve gate. The first gate is positioned centrally along the length of the trapezoidal space and the first and second resins have different colors.

4 Claims, 3 Drawing Sheets

METHOD FOR MANUFACTURING MAGNETIC TAPE CASSETTE

BACKGROUND OF THE INVENTION

The present invention relates to a method for manufacturing a magnetic tape cassette of a type which incorporates a pair of rotatable reels having a magnetic tape wound therearound, and which is formed by a combination of upper and lower half cases molded from a synthetic resin, each having a window portion. The invention also relates to a cassette manufactured by such a method.

Conventionally, audio equipment, video equipment, computers and the like have often used a magnetic tape cassette including a magnetic tape wound around a tape winding member, such as a hub or reel, to achieve recording and reproduction.

Such conventional magnetic tape cassettes are structured such that the tape winding member with the magnetic tape wound therearound is rotatably supported in a cassette case comprising upper and lower half cases, each of which is integrally formed of synthetic resin such as acrylonitrilebutadiene-styrene copolymer resin (hereinafter referred to as ABS resin) or the like.

A typical example of such a magnetic tape cassette is a tape cassette used in audio equipment. The magnetic tape cassette is normally structured in such a manner that a pair of hubs having a magnetic tape wound therearound are rotatably incorporated in and held by a case body composed of upper and lower half cases formed of ABS resin. In manufacturing the magnetic tape cassette, the upper and lower half cases are individually injection molded and are secured together by means of screws to provide a completely assembled magnetic tape cassette.

In recent years, there has been an emphasis on the aesthetic quality of the cassette case, and thus the design of the cassette case has become diversified. Accordingly, the processes used recently for manufacturing cassette cases, which are devised to obtain advantages in both design and productivity, have employed a two-color molding technique, for example.

The conventional manufacturing method using the two-color forming technique for individually forming each of the cassette halves will be described below with reference to FIGS. 4 and 5.

As shown in FIG. 5, a cassette half 40 is formed in two colors by injecting resin into an injection space 52 defined by a fixed metal mold 50, movable metal mold 51 and a slide core 54 moved by a drive device 60, and further by injecting the resin into an injection space formed upon movement of the slide core 54. In this operation, as shown in FIG. 4, there is employed a molding device which forms a plurality of the above-mentioned cassette halves 40 simultaneously.

Normally, in a main body half 41 of the cassette half 40, the resin is supplied to a tooth-shaped portion 47 in an opening formed in the front portion of the cassette through a runner spool 44 branched from a hot runner gate 43. The runner spool 44 can be formed substantially in an H shape, as shown FIG. 4, for example. Also, as occasion demands, a hot runner gate 43 may be provided in the rear of the cassette as well, and the resin can be supplied from the rear side cassette by means of a runner spool 45, as illustrated. Supply of the resin to a window portion 42 is performed by means of a direct hot runner gate 55, as illustrated in FIG. 5.

As shown in FIG. 5, a tunnel gate 46 is used to supply the resin to the main body half. The tunnel gate 46 has a small gate opening area, which inhibits the flow of the resin. If the gate opening area is increased, the resin flow can be enhanced. However, increasing the gate opening area makes it more difficult to remove the resin from the gate area after the mold has been formed. As a result, when the main body half 40 is removed from the metallic mold, the load applied to the tooth-shaped portion 47 due to the gate cutting is relatively large, thereby creating the possibility of the tooth-shaped portion 47 being deformed. Accordingly, the gate opening area must be made small. As a result, if, for example, increasing the window portion 42 results in a greater number of constricted portions in the injection space which retards the flow of the resin, then the flow of the resin may be substantially worsened so as to require a runner spool 45 to be disposed in the rear of the cassette as well, as described above.

Accordingly, in spite of the fact that the cassette half formed using the above-mentioned tunnel gate 46 has its gate disposed in the tooth-shaped portion 47, the tunnel gate inhibits the flow of resin to thereby make it difficult to enhance the forming accuracy thereof. In particular, if the injection forming cycle is shortened so as to enhance the productivity thereof, then accurate formation of the cassette half is made difficult, presenting a significant problem.

SUMMARY OF THE INVENTION

An object of the present invention, therefore, is to eliminate the drawbacks associated with the above-mentioned method for manufacturing a conventional tape cassette.

Accordingly, it is an object of the invention to provide a magnetic tape cassette which prevents a reduced mold forming accuracy due to the flow of resin associated with increasing the productivity of the cassette, and which can provide superior mold forming accuracy with corresponding high productivity.

In order to accomplish the above object, according to the present invention, there is provided a magnetic tape cassette incorporating a magnetic tape wound around a pair of hubs in a cassette case, comprising a combination of upper and lower cassette halves each including a window portion and a main body half, wherein the window portion and main body half are both formed of resins injected from respective valve gates according to a two-color forming technique.

According to the invention, there is provided a method for manufacturing a magnetic tape cassette incorporating a wound magnetic tape in a cassette case composed of a combination of upper and lower half cases each including a window portion and a main body half, the method comprising the steps of: forming the main body half by means of an injection space directly connected to a valve gate; forming the window portion by means of an injection space directly connected to a gate; and positioning at least the valve gate for forming the main body half in a trapezoidal portion centrally located in the front portion of the cassette. The invention also encompasses a magnetic tape cassette manufactured according to such a method.

DESCRIPTION OF THE PREFERRED EMBODIMENTS

Figure 1:
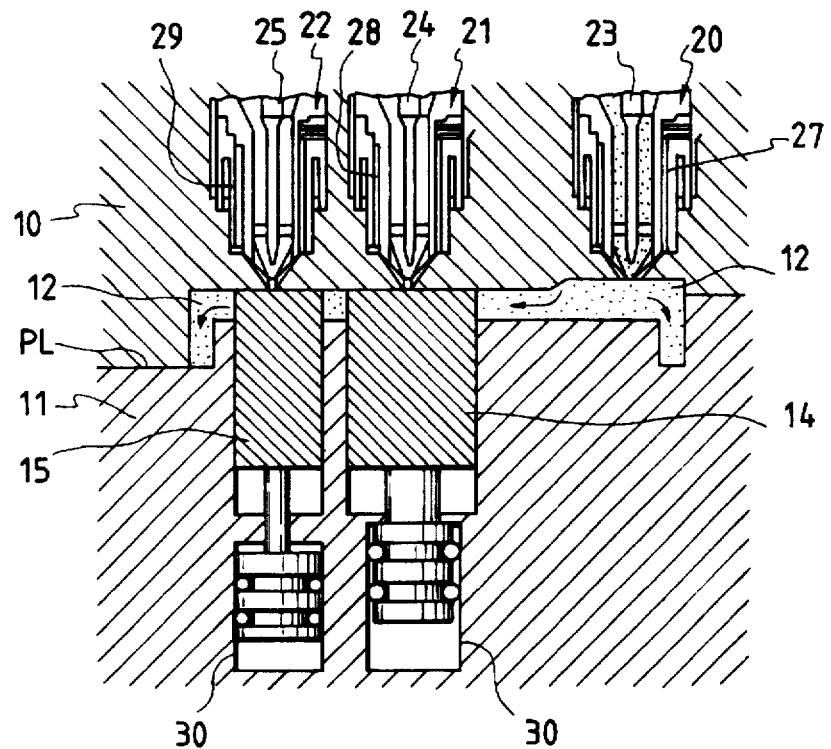
FIG. 1 is a sectional view of main portions of a metal mold used to form a magnetic tape cassette according to the invention, illustrating a first stage in the injection forming process.
Figure 2:
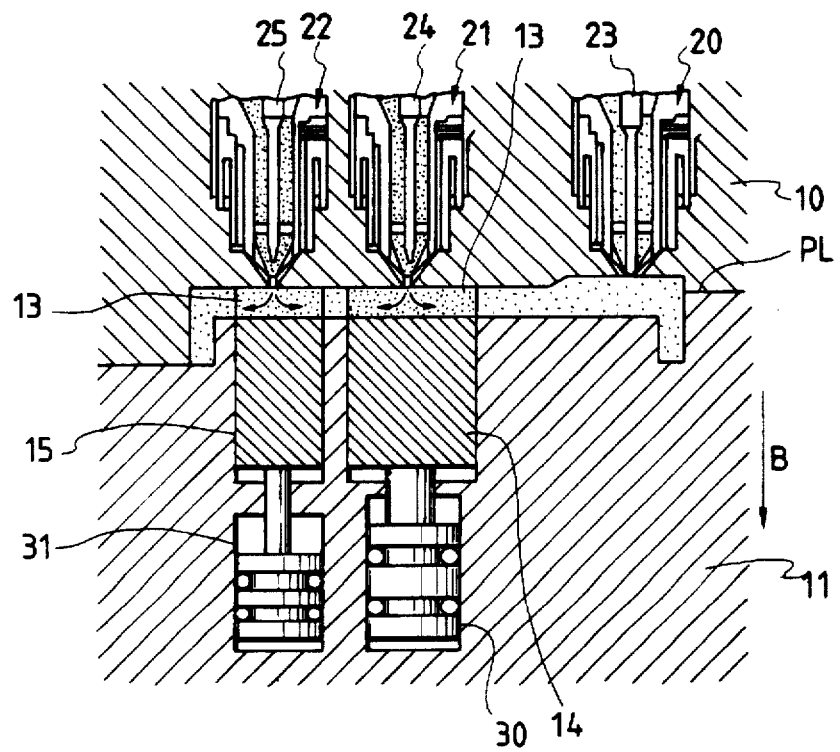
FIG. 2 is a sectional view of main portions of a metal mold used to form a magnetic tape cassette according to the invention, illustrating a second stage in the injection forming process.
Figure 3:
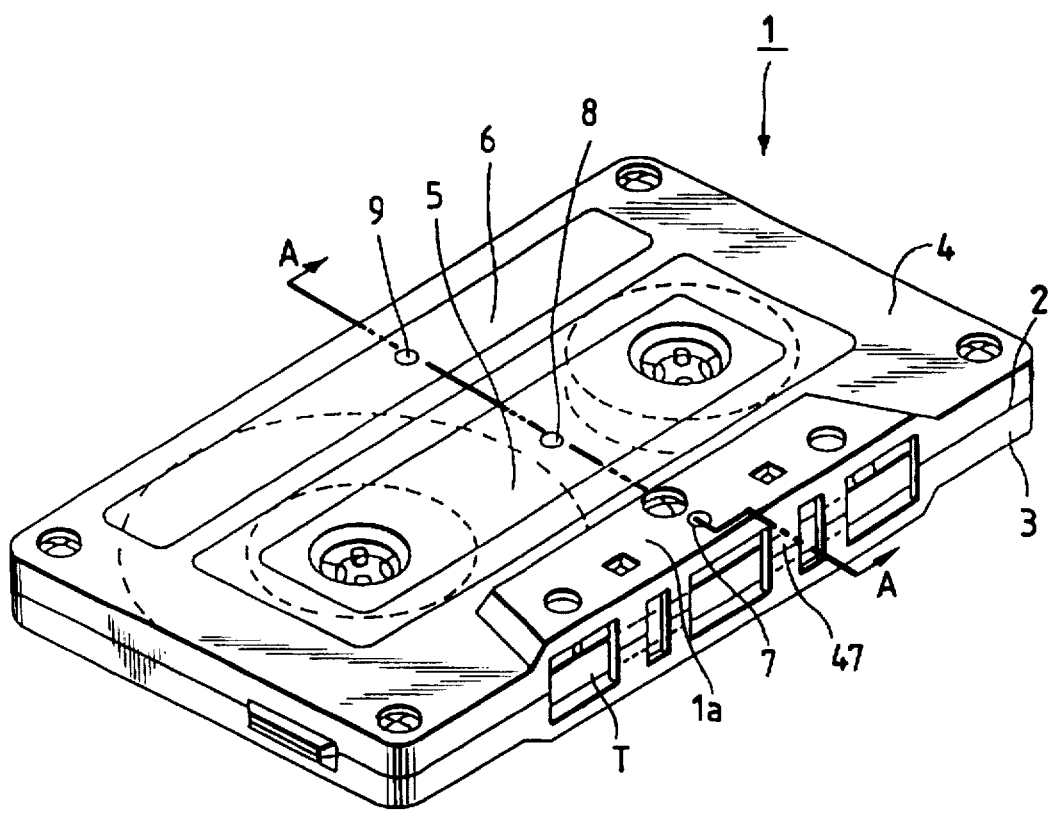
FIG. 3 is a perspective view of an embodiment of a magnetic tape cassette according to the invention.
Figure 4:
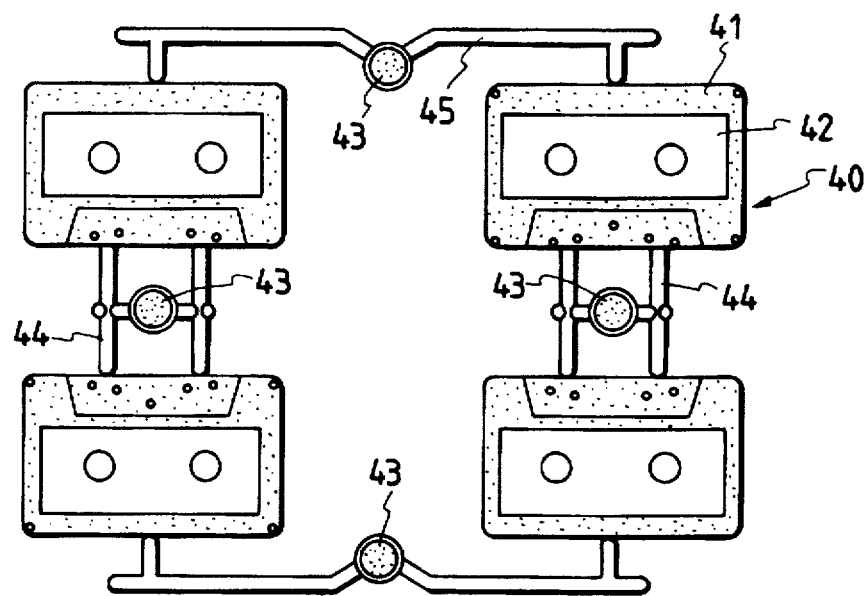
FIG. 4 is a schematic view of mold forming arrangements used with a conventional manufacturing method.
Figure 5:
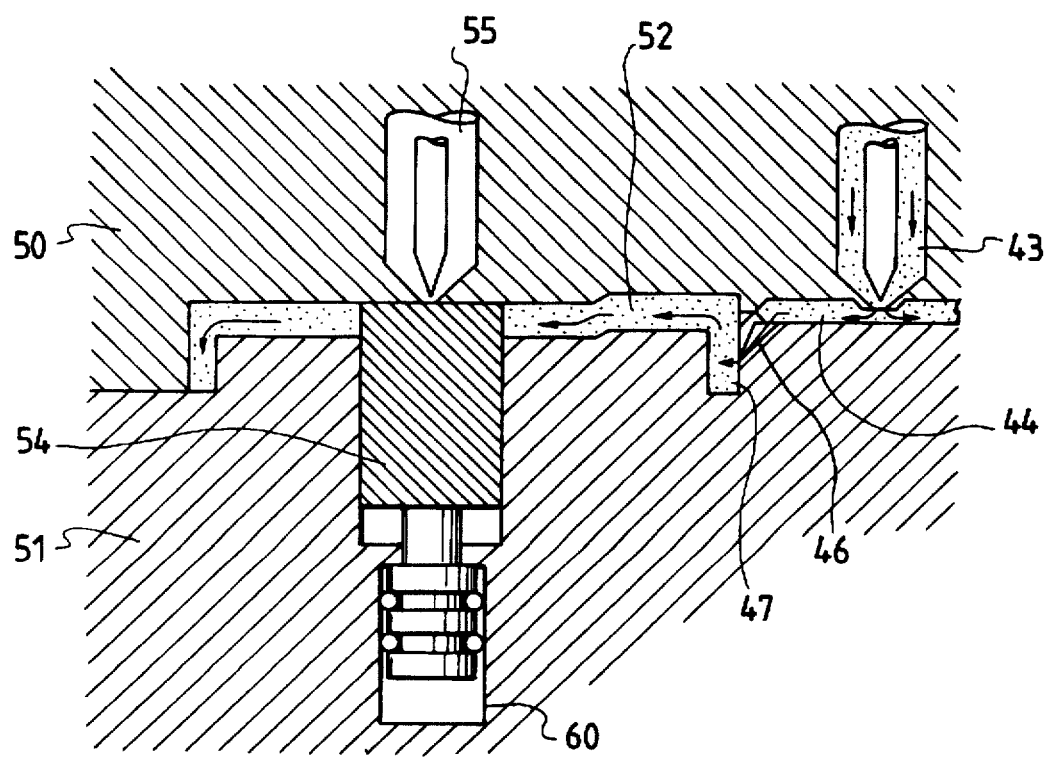
FIG. 5 is a sectional view of a metal mold used to form a magnetic tape cassette according to the conventional process.

A preferred embodiment of a magnetic tape cassette and a method for manufacturing the same according to the invention will be described with reference to the accompanying drawings. FIGS. 1 and 2 are sectional views of the main portions of a metal mold used in a forming device. FIG. 3 is a perspective view of a magnetic tape cassette formed according to the invention.

Referring to FIG. 3, the magnetic tape cassette 1 includes upper and lower cassette half cases 2, 3 and two window parts 5, 6 arranged so as to enable hubs disposed within the cassette case having the tape wound therearound to be readily viewed. The two window parts 5, 6 are formed of a light transmissive resin, which can be either transparent or semitransparent. The portions of a main body half 4 other than the window parts 5, 6 are formed of an opaque resin which has a different light transmissive property than that of the resin of the window parts. In this manner, the tape cassette is formed of two or three kinds of resin by a two-color forming technique using a forming metal mold, as will be described below.

The metal mold shown in FIGS. 1 and 2 is used to form the cassette half cases 2, 3 of the magnetic tape cassette 1. FIGS. 1 and 2 are sections of the metal mold taken along line A—A in FIG. 3.

In the metal mold shown in FIGS. 1 and 2, a fixed metal mold 10, a movable metal mold 11, a first slide core 14 and a second slide core 15 form injection spaces 12, 13. The two slide cores 14 and 15 are movable in a vertical direction by respective drive devices 30 and 31, each of which is implemented with, for example, a piston-type hydraulic system.

In the respective injection spaces 12 and 13, there are provided valve gates 20, 21 and 22, as illustrated in FIG. 1, with the valve gate 20 being centrally located above the trapezoidal region 1A where the cassette thickness is increased. The valve gates 20, 21, 22 respectively include valves 23, 24, 25, each having an opening portion which can be opened or closed. Also, each of the valves 23, 24, 25 includes a shaft which is connected to a drive system such as a hydraulic cylinder (not shown). Further, as necessary, there can be provided heating elements 27, 28, 29 in the outer peripheral portions of the gate for heating the resin.

Next, a description will be provided below of a process for forming the half cases 2 and 3. Initially, as shown in FIG. 1, when forming the main body half 4, the two slide cores 14 and 15, respectively corresponding to the window parts 5, 6, are projected into the injection space 12. In this state, the valve gate 20 is used to inject the first resin on the side of the main body 4 half. After the injection of a given quantity of the first resin, the valve 23 is lowered to thereby close the gate opening.

At this time, since the valve gate 20 is situated centrally in the right and left direction of the cassette and is disposed in a region of the trapezoidal portion 1a where the thickness of the cassette is increased, the right and left balance of the injection pressures can be made equal to thereby prevent deformation due to unbalanced internal stresses occurring in formation and the like. Also, the valve gate 20 has a relatively large opening diameter (opening area) so that the injection pressures can be relatively high and also the pressures can be controlled with ease. Further, since the valve gate 20 having such characteristics is disposed in the trapezoidal portion 1a, the molding accuracy can be significantly improved.

After the main body half 4 is suitably hardened, the first and second slide cores 14 and 15 are moved back downward to thereby form new injection spaces 13. The second resin is then injected by the respective valve gates 24 and 25 into the newly formed injection spaces 13. After injection of a given quantity of the second resin, the valve 24 and 25 are lowered to thereby close the gate openings thereof.

Thereafter, the movable metal mold 11 is moved in the direction of arrow B in FIG. 2 after the resin has cooled to a given degree and the cassette half cases 2 and 3 are removed from the metal mold by use of an ejecting pin (not shown).

In the cassette half cases 2 and 3 formed in this matter, as shown in FIG. 3, there slight gate marks 7, 8 and 9 are left in the half cases. However, when compared with conventional spear gate marks, the gate marks resulting from the present invention have no projections, hence eliminating the need for subsequent treatment. At the same time, the adjacent portions of the gates are not discolored, so that a better appearance can be provided.

In this embodiment, the first and second resins used to form the upper and lower half cases 2 and 3 are not limited to special resins, but ABS resin, AS resin and the like can be favorably used for this purpose.

The metal mold structure used in the present invention is not limited to those shown in FIGS. 1 and 2, but other types of structures can also be employed. For example, a structure including a large number of slide cores can be used. Also, the manufacturing method according to the present invention is not limited to the two-color forming technique using the above-mentioned slide cores, but other types of two-color forming devices can also be used in which a movable metal mold is rotationally moved to thereby form a new injection space by use of previously injected resin. Further, according to the invention, the metal mold may be formed in various shapes. Also, the shape of the magnetic tape cassette of the invention is not limited to that shown in the drawings, but, of course, the present invention can also apply to various other magnetic tape cassette shapes.

Further, although in the illustrated embodiment a description has been given of an audio magnetic tape cassette, the invention is not limited to audio magnetic tape cassettes, but, of course, can also be utilized with various injection products such as video cassettes, optical disc cartridges and the like.

As has been described heretofore, due to the fact that the window part and main body half are two-color components formed of the resin injected from the valve gates, the process of forming the magnetic tape cassette according to the invention is improved in resin flowability and thus, even if the forming cycle is shortened for the purpose of improving productivity thereof, the present invention can supply a magnetic tape cassette which has half cases formed with a high molding accuracy.

Also, since at least the gate for the main body half is positioned in the trapezoidal portion disposed centrally in the right and left direction of the cassette in front of the cassette, the control of the injection pressures is easier when compared with the conventional method in which resin is injected for the tooth-shaped portion described above. In particular, the forming accuracy on the side of the cassette opening of the main body half can be enhanced so that a magnetic tape cassette of a higher quality can be manufactured. Further, due to the direct arrangement of the valve gates, running will not occur to thereby improve the conservation of the resins used and also to thereby improve the appearance. In addition, according to the invention, since all gates are valve gates, there is eliminated the need for a cooling time to clear the resin from the gates to thereby improve the forming cycle.

What is claimed is:

1. A method for manufacturing a magnetic tape cassette including a combination of upper and lower half cases each including a window part and a main body half, said main body half including a trapezoidal portion on a top side of said main body half extending along a length thereof and defining a portion of said cassette having an increased thickness, said method comprising the steps of:

providing a mold having a first injection space defining said main body half and a second injection space defining said window part;

providing a first valve gate, communicating with said first injection space, in said mold at a position of said trapezoidal portion of said main body half and positioning said first valve gate centrally along the length of said trapezoidal portion;

injecting a first resin into said first injection space through said first valve gate;

providing a second valve gate, communicating with said second injection space, in said mold; and injecting a second resin into said second injection space through said second valve gate.

2. The method for manufacturing a magnetic tape cassette of claim 1, wherein said injecting steps comprises injecting resins having different colors.

3. A method for manufacturing a magnetic tape cassette including a combination of upper and lower half cases each including a window part and a main body half, said main body half including a trapezoidal portion on a top side of said main body half extending along a length thereof and defining a portion of said cassette having an increased thickness, said method comprising the steps of:

providing a mold having a first injection space defining said main body half and a second injection space defining said window part;

providing a first valve gate, communicating with said first injection space, in said mold at a position of said trapezoidal portion of said main body half and positioning said first valve gate centrally along the length of said trapezoidal portion;

projecting a slide core into said second injection space;

injecting a first resin through said first gate and into said first injection space;

closing said first gate and allowing said first resin to harden;

providing a second valve gate, communicating with said second injection space, in said mold;

removing said slide core from said second injection space; and injecting a second resin through said second valve gate into said second injection space.

4. The method for manufacturing a magnetic tape cassette of claim 3, wherein said injecting steps comprises injecting resins having different colors.

\* \* \* \* \*